No. 824,555. PATENTED JUNE 26, 1906.
H. LIVESEY.
MEANS FOR SUPPORTING AND HOLDING RAILWAY RAILS.
APPLICATION FILED APR. 11, 1905.
4 SHEETS—SHEET 1.
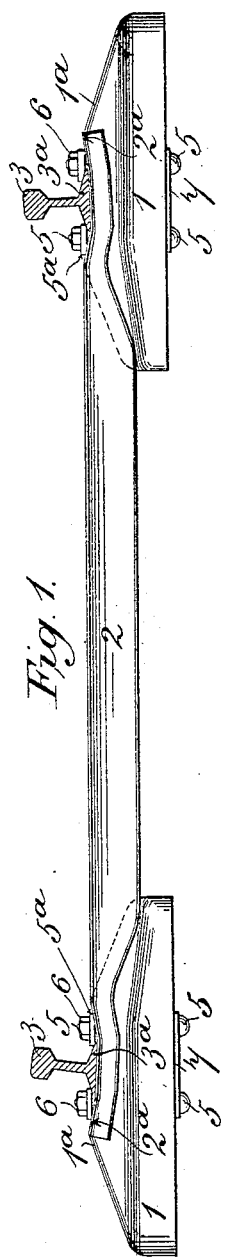
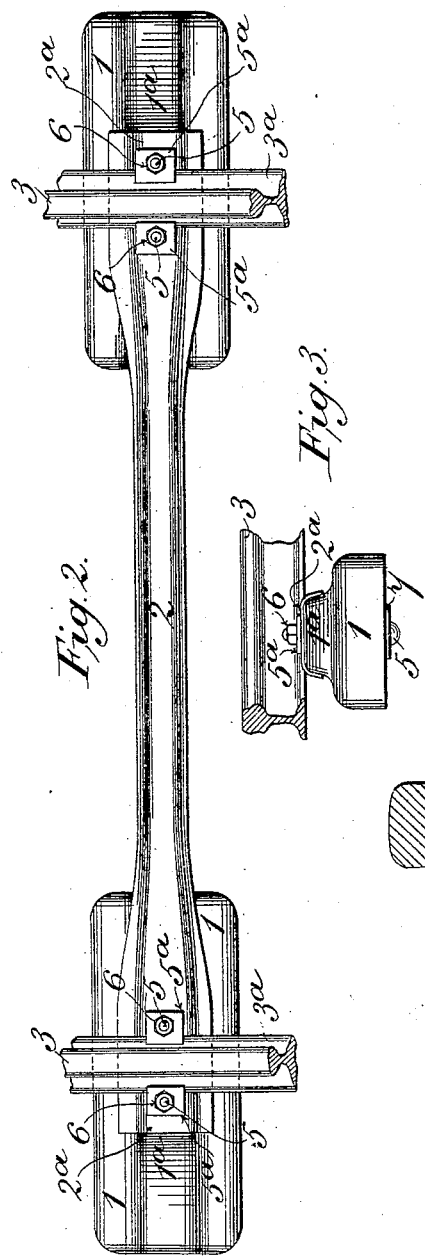
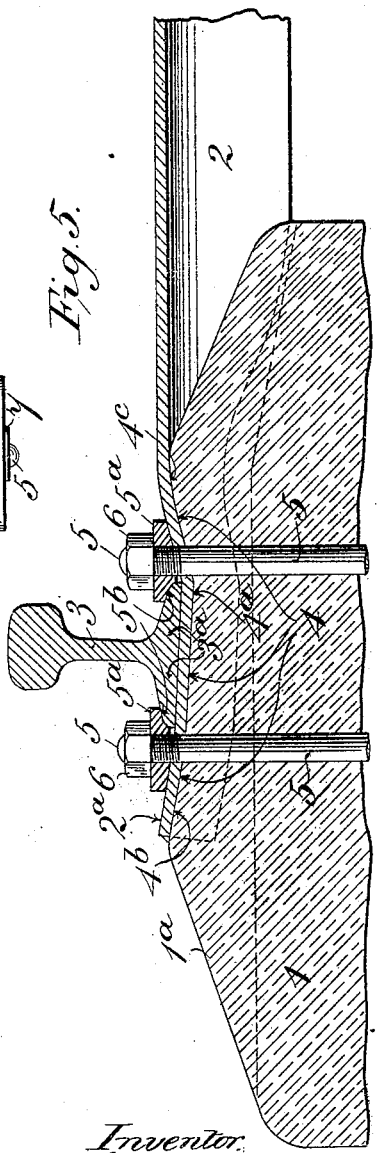
Witnesses.
W. Henry Simms
R. Clough.
Inventor.
H. Livesey
Attorney.

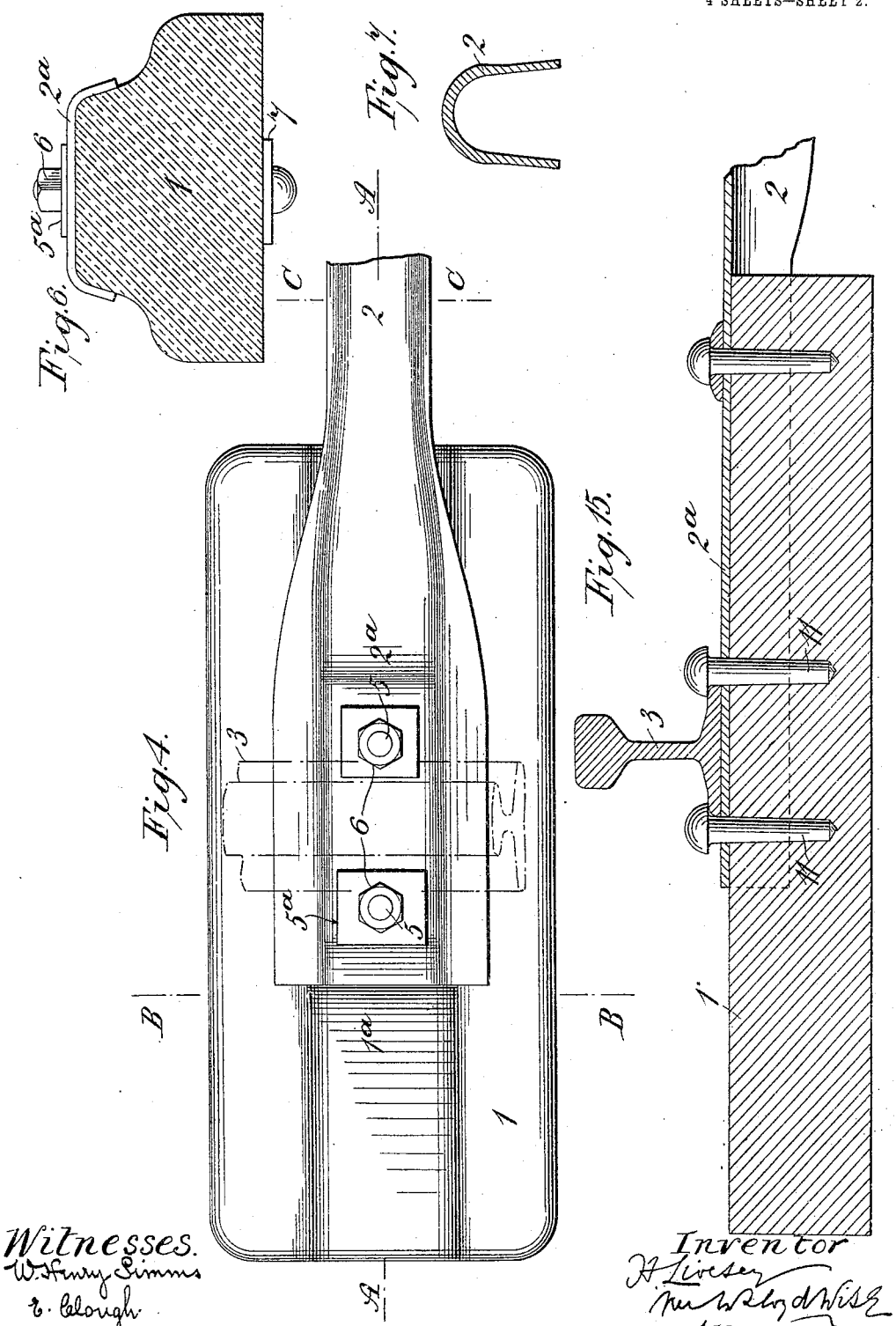

No. 824,555. PATENTED JUNE 26, 1906.
H. LIVESEY.
MEANS FOR SUPPORTING AND HOLDING RAILWAY RAILS.
APPLICATION FILED APR. 11, 1905.
4 SHEETS—SHEET 3.
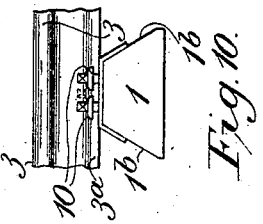
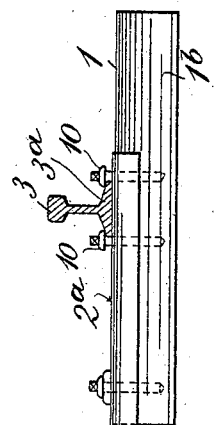
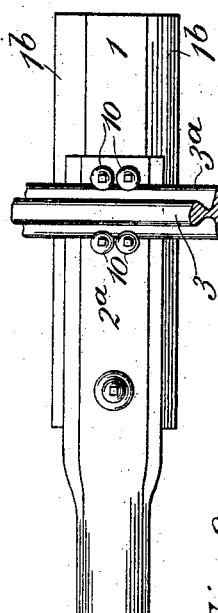
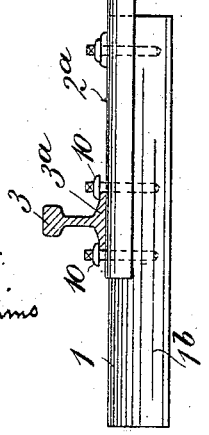
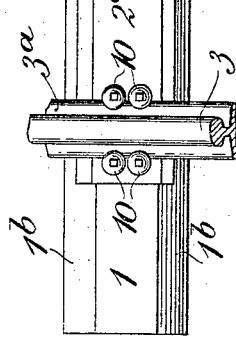

No. 824,555. PATENTED JUNE 26, 1906.
H. LIVESEY.
MEANS FOR SUPPORTING AND HOLDING RAILWAY RAILS.
APPLICATION FILED APR. 11, 1905.
4 SHEETS—SHEET 4.
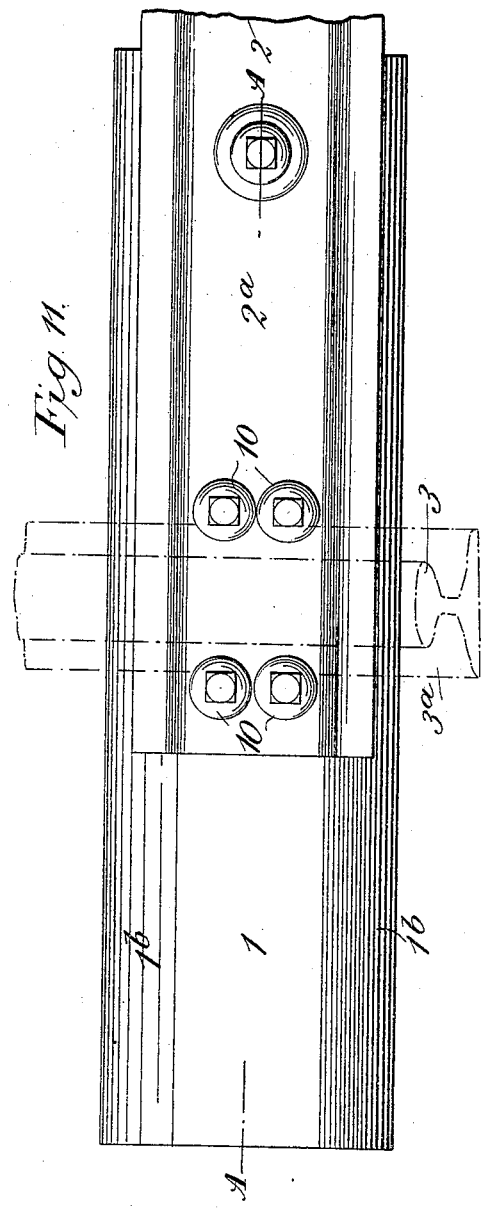
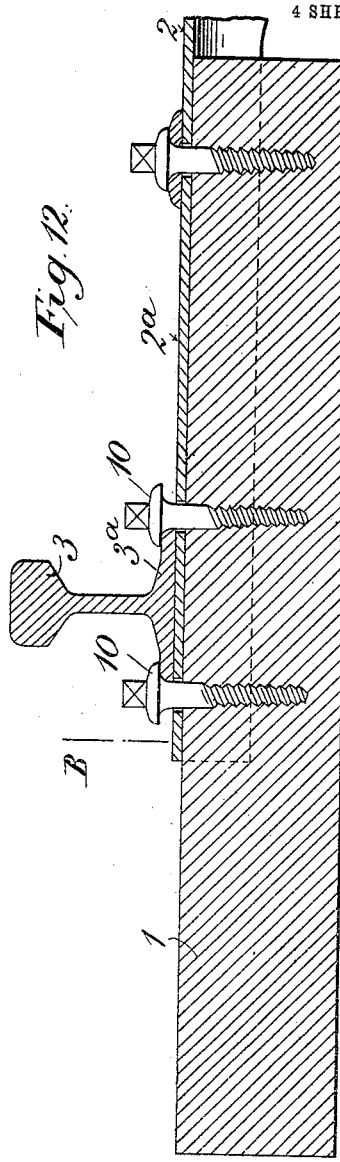
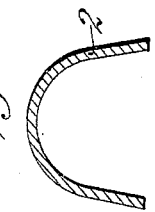
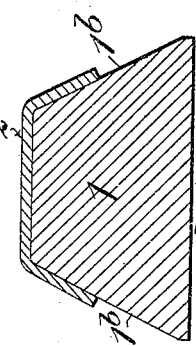
Witnesses.
W. Henry Simms
E. Clough.
Inventor:
H. Livesey
Attorney

UNITED STATES PATENT OFFICE.

HARRY LIVESEY, OF LONDON, ENGLAND.

MEANS FOR SUPPORTING AND HOLDING RAILWAY-RAILS.

No. 824,555.     Specification of Letters Patent.     Patented June 26, 1906.

Application filed April 11, 1905. Serial No. 254,994.

*To all whom it may concern:*

Be it known that I, HARRY LIVESEY, a subject of the King of Great Britain and Ireland, residing at London, England, have invented Improvements in Means for Supporting and Holding Railway-Rails, of which the following is a specification.

This invention has reference to improved means for supporting and holding railway-rails in position for use.

Supporting and holding means according thereto comprises blocks of concrete, artificial stone, slag, timber, or other suitable material molded or formed to shape and connected together in pairs, at a suitable distance apart to suit the railway-gage by a rigid transverse member of metal, the end portions of which are shaped to engage the upper portions of the pair of blocks, so as to hold the blocks together in a transverse and longitudinal direction and also to form seats for the two rails to be supported thereon, each rail being firmly held in place between the corresponding end portion of the transverse member and suitable holding-down or fastening devices that are adapted to firmly engage the foot of the rail and are connected to the transverse member and the corresponding block.

A pair of blocks and a rigid transverse connecting member, as described, constitute, in effect, a double or compound railway-chair or combined railway chair and sleeper, the separate parts of which are capable of being readily transported from place to place and connected together at the place where they are to be used to support and hold a pair of rails in position for use, the construction being such that when the blocks, transverse member, and rails are connected together by the holding-down or fastening means the blocks and transverse member will form a strong rigid rail support or structure not liable to bend at any part thereof. Thus it will be understood each rigid transverse member serves not only to hold the corresponding pair of supporting-blocks at the required distance apart, but also to form therewith a transversely-rigid rail-support and to serve as a double chair for a pair of rails. Such a rigid transverse member is hereinafter referred to as a "double chair." As will be obvious, the blocks, the double chair, and the holding-down or fastening devices can be constructed in various shapes.

In the accompanying illustrative drawings, Figures 1, 2, and 3 show, respectively, in side elevation, plan, and end elevation one construction of rail supporting and holding means according to this invention suitable for supporting flat-bottom or Vignole rails in a canted position. Fig. 4 shows one of the blocks with the adjacent end portion of the double chair and fastening means to a larger scale than Figs. 1, 2, and 3; and Figs. 5, 6, and 7 are sections taken on the line A A, B B, and C C, respectively, of Fig. 4. Figs. 8 to 14, inclusive, are similar views to Figs. 1 to 7, respectively, showing a further modified construction. Fig. 15 is a similar view to Fig. 12, showing a further modification.

In Figs. 1 to 7, inclusive, 1 1 are molded blocks of concrete, artificial stone, or equivalent material. 2 is a rigid double transverse chair, the end portions of which are shaped to engage the upper portions of the pair of blocks 1 and hold them together both in the transverse direction and in the longitudinal direction of the track, and 3 3 are flat-bottom or Vignole rails secured upon the end portions of the double chair and the blocks. Each block 1 may conveniently be of rectangular or approximately rectangular shape in plan, (see Figs. 2 and 4,) its upper side being inclined or curved upwardly from both sides and both ends, so as to form a raised central portion 1$^a$. The upper surface of each block 1 may advantageously be recessed at 4 to receive the correspondingly-shaped end portion 2$^a$ of the double chair 2, so that the two blocks constituting a pair will be held at the required distance apart when the end portions of the double chair are bedded in the recesses, the shape of the recesses and end portions of the double chair, as seen in end view—that is to say, looking along the track—being such as to support the pair of rails in the required position either vertically or with any desired cant to one side that may be necesssary to suit circumstances. In the example the central portion 4$^a$ of the bottom of the recess 4 may be horizontal or, as shown, be slightly inclined in an upward and outward direction relatively to the center line of the permanent way when the rail 3 is to be canted, and the two end portions 4$^b$ 4$^c$ of the bottom of the recess are inclined upwardly and outwardly relatively to the central portion 4$^a$, the outer portion 4$^b$ being inclined to a greater angle than the central portion 4$^a$ when such portion is inclined. The end portions 2$^a$ of the double chair 2 are shaped to fit the recesses 4 in the pair of blocks 1 and also to overlap the front and rear sides of the blocks, as shown in Figs. 3 and 6. For the latter purpose the said end portions 2ª are made of channel-section, (see Figs. 3 and 6,) the channel being at the under side of the chair. The remaining or intermediate portion of the double chair may also be of channel-section, (see Fig. 7,) the channel preferably increasing in depth toward the center of the double chair, (see Figs. 1 and 5,) so as to render such chair sufficiently rigid to prevent it bending under any stress to which it may be subjected in ordinary use. The width of the double chair in cross-section is much less than that of the base portions of the blocks 1, measured in the same direction, and the central portion of the double chair may be narrower than the end portions thereof. (See Figs. 2 and 4.) Each rail 3 may be held down on the corresponding end 2ª of the double chair 2 and block 1 by holding-down bolts 5 and holding-down devices 5ª, held in place on the bolts by nuts 6, or it may be by cotters. The holding-down bolts 5, of which there may be two for each block 1, may pass upwardly through a flat metal plate 7, placed against the bottom of the block, the heads of the bolts being below the plate. The holding-down devices 5ª (shown) are metal clips, the lower surfaces of which are shaped to suit the upper surface of the end portions 2ª of the double chair 2, above which they are placed, and recessed at 5ᵇ to receive or overlap the foot 3ª of the rail 3, placed between them, while their upper sides are flat to receive the holding-down nuts 6, (or cotters,) the arrangement being such that upon tightening up all the nuts (or cotters) the feet 3ª of the rails 3 will be tightly clamped between the corresponding ends 2ª of the double chair and the clips 5ª, and the blocks and double chair will be rigidly fixed together. Other forms of fastening devices may be used, if desired, to hold down the feet of rails supported as described.

In the modified construction shown in Figs. 8 to 14, inclusive, the blocks 1 are of wood, the upper end portions of which are made of less dimensions than the lower portions in the longitudinal direction of the track, as by tapering opposite sides thereof, as shown at 1ᵇ in Figs. 10 and 13, the end portions 2ª of the double chair being shaped to fit the inclined front and rear sides of the blocks and hold them in place. In this example the upper surfaces of the blocks are flat and horizontal, and the central parts of the end portions 2ª of the double chair are of similar shape, so as to support the rails 3 vertically; but the said parts may of course be slightly inclined in an upward and outward direction in cases where it is desired to support the rails 3 in a canted position, as in Figs. 1 and 5. The rails in this example are held down upon the end portions 2ª of the double chair 2 and the blocks 1 by coach-screws 10, that are passed through the said end portions of the double chair and screwed into the blocks and the heads of which bear directly against the feet of the rails, which are placed between the screws. The rails in this arrangement may, however, be held down by bolts and clips, as in Figs. 1 to 6, or by the heads of spikes 11, driven into the blocks, as in Fig. 15.

By the means described the construction of the permanent way of railways can be facilitated and cheapened and the track rendered very strong and durable.

What I claim is—

1. Means for supporting and holding railway-rails in position for use, comprising a transverse pair of blocks, a rigid transverse member of channeled section connecting said blocks and adapted to form a double chair, and holding-down or fastening means adapted to hold the rails to be supported upon the end portions of said transverse member.

2. Means for supporting and holding railway-rails in position for use, comprising a pair of blocks, a rigid transverse member of inverted-U section extending across and bearing upon and engaging with said blocks, and holding-down or fastening means adapted to extend through the end portions of said transverse member and engage said blocks and to hold the rails in position upon the said end portions of the transverse member.

3. Means for supporting and holding railway-rails in position for use, comprising a transverse pair of blocks, a rigid transverse member or double chair of metal resting upon said blocks but of less dimension in the direction of the track than the bottom of said blocks, and holding-down or fastening means extending through the end portions of said transverse member into said blocks and connected thereto and adapted to hold rails upon the end portions of said transverse member.

4. Means for supporting and holding railway-rails in position for use, comprising transverse pairs of blocks having their base portions of greater bearing-area than their upper portions, rigid transverse members or double chairs resting upon and fitting the upper reduced portions of the blocks in a fore-and-aft direction, and means adapted to hold rails in place upon the end portions of said transverse members and to hold each pair of blocks, the corresponding double chair, and the rails firmly together.

5. Means for supporting and holding railway-rails in position for use, comprising transverse pairs of blocks having their upper portions of less dimensions in a fore-and-aft direction than their lower portions, rigid transverse members or double chairs each having its end portions of channel-section and fitting over and resting upon the reduced upper ends of a pair of blocks, and means adapted to hold rails in place upon the end portions of said transverse members and to hold each pair of blocks, the corresponding double chair and the rails firmly together.

6. Means for supporting and holding railway-rails in position for use, comprising transversely-arranged pairs of blocks of molded concrete or like material, rigid transverse members or double chairs formed of metal and each having its end portions resting upon and fitting the upper portions of a pair of such blocks, and means adapted to hold rails in place upon the end portions of the double chairs and to hold each pair of blocks, the corresponding double chair and the rails firmly together.

7. Means for supporting and holding railway-rails in position for use, comprising transversely-arranged pairs of blocks formed of concrete or like material molded to shape and each formed with a recessed upper surface, rigid transverse members or double chairs of channel-section and each having its end portions adapted to rest upon and fit the recessed upper surfaces of a pair of blocks and hold them at the required distance apart, the said transverse members being also recessed at each end where they fit one of the said blocks to receive the foot of a rail and thus to assist in holding the rails at the required distance apart, and means adapted to hold the rails in place upon the end portions of the double chairs and to hold each pair of blocks, the corresponding double chair and the rails firmly together.

8. Means for supporting and holding railway-rails in position for use, comprising transversely-arranged pairs of blocks formed of concrete or like material molded to shape and each formed with a recessed upper surface, rigid transverse members or double chairs of channel-section and each having its end portions adapted to rest upon and fit the recessed upper surfaces of a pair of blocks and hold them in place both in a longitudinal direction and in a transverse direction the said transverse members being also recessed at each end where they fit one of the said blocks to receive the foot of a rail and thus to assist in holding the rails at the required distance apart, and means adapted to hold the rails in place upon the end portions of the double chairs and to hold each pair of blocks, the corresponding double chair and the rails firmly together.

9. Means for supporting and holding railway-rails in position for use, comprising transversely-arranged pairs of blocks each of which is recessed at its upper end, rigid transverse members or double chairs formed of metal each having its end portions shaped to rest upon and fit the recessed upper end portions of a pair of blocks and to support a pair of rails in a canted position, and means adapted to hold rails in place upon the end portions of the double chairs and to hold each pair of blocks, the corresponding double chair and the rails firmly together.

10. The combination of transverse pairs of blocks, rigid transverse members or double chairs each made of inverted-U section throughout its length and resting upon and connecting a pair of blocks, a pair of rails resting upon the end portions of the transverse members or double chairs, and holding-down or fastening means adapted to hold the rails, transverse members and blocks firmly together.

11. The combination of transverse pairs of blocks, rigid transverse members or double chairs each resting upon and connecting a pair of blocks and formed of channeled metal, a pair of rails resting upon the end portions of the transverse members or double chairs, and holding-down or fastening means adapted to hold the rails, transverse members and blocks firmly together.

12. The combination of transverse pairs of blocks having their base portions of greater bearing-area than their upper portions, rigid transverse members or double chairs resting upon and fitting the upper reduced portions of the blocks in a fore-and-aft direction, rails resting upon the end portions of said double chairs, and holding-down means adapted to hold each pair of blocks, double chair, and rails firmly together.

13. The combination of transverse pairs of blocks having their upper portions of less dimensions in a fore-and-aft direction than their lower portions, rigid transverse members or double chairs each having its end portions of channel-section and fitting over and resting upon the reduced upper ends of a pair of blocks, rails resting upon the end portions of said double chairs, and means for holding the rails, chairs and blocks firmly together.

14. The combination of transversely-arranged pairs of blocks each of which is recessed at its upper end, rigid transverse members or double chairs formed of metal each having its end portions shaped to rest upon and fit the recessed upper end portions of a pair of blocks and to support a pair of rails in a canted position, rails resting upon the end portions of said double chairs, and means adapted to hold the rails in place and connect them and the double chairs and blocks firmly together.

15. The combination of a transverse pair of blocks formed of concrete or like material molded to shape with reduced upper ends each formed with a longitudinal recess, a rigid transverse member or double chair formed of metal of channel-section and having its end portions bent and shaped to fit the recessed upper ends of the pair of blocks, a pair of rails resting upon the end portions of said double chair, bolts extending upwardly through said blocks and the end portions of said double chair, metal clamps on the upper ends of said blocks and engaging the feet of said rails, and means for holding down said clamps.

16. A railway-rail-supporting block formed with a reduced upper portion having therein a longitudinal recess the bottom of which comprises a central or intermediate portion and outwardly-inclined side portions.

17. A railway-rail-supporting block formed with its upper portion made of less dimensions in a fore-and-aft direction than its base portion and with a longitudinal recess the central portion of the bottom of which is inclined transversely and the end portions of which are inclined to said central portion.

18. For supporting railway-rails, a rigid transverse connecting member of metal adapted to form a double chair and the end portions of which are of channel-section at the under side and are adapted to overlap and fit the front and rear sides of a pair of supporting-blocks with which it is to be used, and the intermediate portion of which is also of channel-section and of greater depth than the end portions, substantially as described and shown.

19. For supporting railway-rails, a rigid transverse metal connecting member of channel-section from end to end, its end portions being made of greater width but less depth than its intermediate portion and adapted to overlap and fit the front and rear sides of a pair of supporting-blocks with which it is to be used.

20. For supporting railway-rails, a rigid transverse metal connecting member of channel-section from end to end, its end portions being made of greater width but less depth than its intermediate portion and adapted to overlap and fit the front and rear sides of a pair of supporting-blocks with which it is to be used, and inclined or canted at the parts where rails are to rest thereon.

Signed at London, England, this 30th day of March, 1905.

HARRY LIVESEY.

Witnesses:
H. D. JAMESON,
F. L. RAND.